United States Patent [19]
LeFebre

[11] 3,981,632
[45] Sept. 21, 1976

[54] METERING PUMP

[76] Inventor: Halbert Allen LeFebre, 66 Monte Veda, P. O. Box 314, Orinda, Calif. 94563

[22] Filed: Apr. 24, 1975

[21] Appl. No.: 571,317

[52] U.S. Cl. ............................ 417/413; 417/470
[51] Int. Cl.² ................................. F04B 19/00
[58] Field of Search .......... 417/328, 316, 412, 413, 417/415, 470

[56] References Cited
UNITED STATES PATENTS

| | | | |
|---|---|---|---|
| 862,867 | 8/1907 | Eggleston | 417/395 |
| 2,005,504 | 6/1935 | Prautzsch | 417/415 |
| 2,429,441 | 10/1947 | Williams | 417/413 |
| 2,488,995 | 11/1949 | Thiberg | 417/413 |
| 3,410,059 | 11/1968 | Garner | 417/413 |
| 3,411,704 | 11/1968 | Hilgert et al. | 417/413 |
| 3,515,966 | 6/1970 | De Valroger et al. | 417/413 |

Primary Examiner—William L. Freeh
Assistant Examiner—G. P. La Pointe
Attorney, Agent, or Firm—Oswald H. Milmore

[57] ABSTRACT

A metering pump for determining the quantity of a fluid flowing at an externally-determined rate, e.g., for measuring the volume of a gas, such as air, flowing through a flow-restrictive element, such as a filter, has a variable-volume chamber (e.g., a bellows) including a movable wall which is urged in one direction (e.g., toward expansion if an inspirator) by resilient means and is driven in the opposite direction by mechanical means, such as a reciprocable lever arm which engages the wall but leaves it during a part of its movement, said means having electrical contacts in a circuit which powers an electrical motor driving the mechanical means, the contacts being open when the mechanical means leaves the wall, permitting the wall to move at a rate determined by the fluid flow rate. Counting means, such as a counter, are coupled to the electric motor or circuit for counting the movements of the wall.

13 Claims, 10 Drawing Figures

METERING PUMP

The invention relates to pumps for metering the flow of a fluid which flows at an externally-determined flow rate, the fluid being a gas, such as air, or a liquid and passing through a unit, such as a filter in a hose or rigidly secured to or within the pump, which presents some flow resistance. Such metering pumps find application, for example, in pollution-monitoring devices, wherein the hazardous or potentially hazardous pollutants are collected by a filter (which may be mechanical or may include an absorbent or an adsorbent); in such devices, the quantity of pollutants is determined, as by weighing or by a chemical analysis, and it is necessary to determine the quantity, specifically the volume, of air that has passed through the filter during the monitoring period. Other applications are possible; in all, some pumping action that causes the flow of fluid is necessary.

The pump of the invention is of small capacity and is intended, in a preferred application, to be carried on or within the clothing of a person who is exposed to the pollution-carrying atmosphere, the filter being also carried by such person.

Prior devices for metering the flow of fluid, e.g., of air after flowing through a filter, included the use of a high-frequency pump, usually having many, such as from ten to sixty, expansions and contractions of a pumping chamber per second, the pumping rate being usually constant and independent of the gas flow rate. They determined an approximate gas flow rate but this determination was not accurate.

In contrast, the present invention provides a metering pump in which the expansion or contraction of a pumping chamber is determined by the rate of fluid flow which is governed, in turn, by an external condition, such as the resistance of a filter. It operates at a low frequency — such as one cycle of expansion and contraction of the variable-volume chamber for every second or for a longer period, such as one or several minutes or even hours.

The object of the invention is to provide a metering pump which measures the volume of fluid, such as a gas, passing therethrough and permits the fluid to flow at a flow rate which is externally determined, as by a flow restriction and/or a filter, and which operates at a speed governed by said externally-determined flow rate, i.e., wherein the speed of the pump is not determined by the internal characteristics of the pump.

The foregoing does not imply that the pump has no influence on the fluid flow rate, since this rate is affected by the pump, such as the degree of suction and/or pressure created thereby.

Ancillary, it is an object to provide a metering pump which is capable of measuring very low rates of fluid flow, as from 5 to 50,000 cubic centimeters per hour.

A more specific object is to provide a metering pump wherein flow of fluid is induced by an expansible chamber having a movable wall (e.g., a bellows or a cylinder with a piston) wherein the wall is urged in one direction by resilient means and is positively driven in the opposite direction by mechanical means which is ineffective during at least a part of the wall movement in said one direction, whereby the wall moves at a rate determined by the external flow restriction, the pump having means for actuating the mechanical means intermittently and, further, means for counting the cycles of operation of the wall.

Other specific objects, attained in some embodiments, are:

To provide a metering pump which includes valve means, such one or more valves that are actuated mechanically or are pressure responsive, being connected to the expansion chamber, for causing flow of fluid through the chamber.

Specifically, it is an object to provide a metering pump wherein at least one valve is controlled by the mechanism for moving the wall in the said opposite direction. In one embodiment, a normally-closed valve to the chamber is provided and is arranged to be opened when the mechanical means engages the movable wall.

To provide a metering pump wherein the mechanical means for moving the wall in the said opposite direction is driven by an electric motor (usually through a cam) which motor is controlled by an electrical circuit which includes a source of electrical power, an electrical contact on said mechanical means and a mating electrical contact on the movable wall, whereby interruption of the circuit by separation of said contacts causes a stopping of the movement of the motor and the mechanical means and of the counting means associated therewith, intermittently.

To provide a metering pump which is an inspirator, wherein said resilient means is arranged to expand the chamber volume as the wall moves in the said one direction. This is preferably in combination with the electrical control circuit mentioned in the preceding object.

To provide a metering pump having the electrical control circuit mentioned in the next but one preceding object which is arranged with means for causing the motor, and hence the counting means, to receive intermittently only a predetermined quantity of electrical energy, this energy being supplied only when the contacts are closed; thereby extremely low rates of operation of the metering pump are possible.

To provide a metering pump having at least two check valves, e.g., pressure-responsive valves of resilient or rubber material, such as flapper valves, for permitting the flow of fluid into and out of the expansible chamber, the exhaust valve being constructed, adjusted and/or mounted to open at a higher pressure within the chamber than the inlet valve. Advantageously, such a pump includes one or more of the features mentioned in any of the foregoing objects.

In summary, the metering pump of the invention includes a variable-volume chamber having a movable wall, means for reciprocating the wall including resilient means urging the wall in one direction at a speed determined by the externally determined flow rate of fluid (e.g., in one embodiment, to draw fluid into the chamber at an externally determined rate) and positive mechanical means for moving the wall in the opposite direction, the latter means being ineffective to control the movement of the wall during at least a part — usually the major part - of movement of the wall in the said one direction, valve means, including one or more valves, for causing the flow of fluid through the chamber upon reciprocation of the wall, and means for counting the movements of the wall, coupled to or associated with an electrical circuit connected to control the counter. The electrical circuit has electrical contacts which are opened to disable or stop the mechanical means, as upon movement of the mechanical means relatively to the wall.

In a specific application, the pump is an inspirator, i.e., it is used to draw into its chamber a gas, such as air, previously flowing through a filter unit that offers some flow resistance and collects pollutants. In this case the resilient means urges the wall in a direction to expand the chamber and the mechanical means acts to contract the chamber volume. The mechanical means may be pivoted lever arm that engages the wall during contraction of the chamber volume and moves during the alternate half-cycle more rapidly than the wall to leave it free to move under the influence of the resilient means at a rate determined by the flow resistance of the filter unit. The electrical contacts, which may be closed by engagement of the mechanical means with the wall, start the electric motor and the counter intermittently. In this embodiment, there need be only one valve, which is normally closed but is opened when the mechanical means engages the wall. However, other valve-actuating means, coupled to the movements of the electric motor and/or the mechanical means may be used.

In another embodiment, the metering pump is used to force the fluid outwardly through a flow restriction at an externally determined flow rate, and the movable wall acts resiliently to contract the chamber. In this case, the mechanical means moves the wall in the direction to expand the chamber. In most applications of this embodiment, two valves are provided, one for admitting fluid into and the other for exhausting fluid from the chamber; they may both be pressure-actuated or mechanical means controlled by the electric motor and/or the actuating mechanism for the mechanical means can operate the valve or valves.

In still another application, especially suitable for very low flow rates, which may be used in any of the preceding embodiments, the electrical circuit which controls the electric motor, the mechanical means and the counter, is arranged to transmit to the motor and associated parts only a predetermined quantity of electrical energy and this only when the electrical contacts are closed; hence, the electric motor and the associated parts advance only periodically, and the time intervals may be pre-selected by selecting suitable circuit elements.

The invention will be further described with reference to the accompanying drawings which show, by way of illustration, four preferred embodiments, wherein.

FIRST EMBODIMENT

Figure 1:
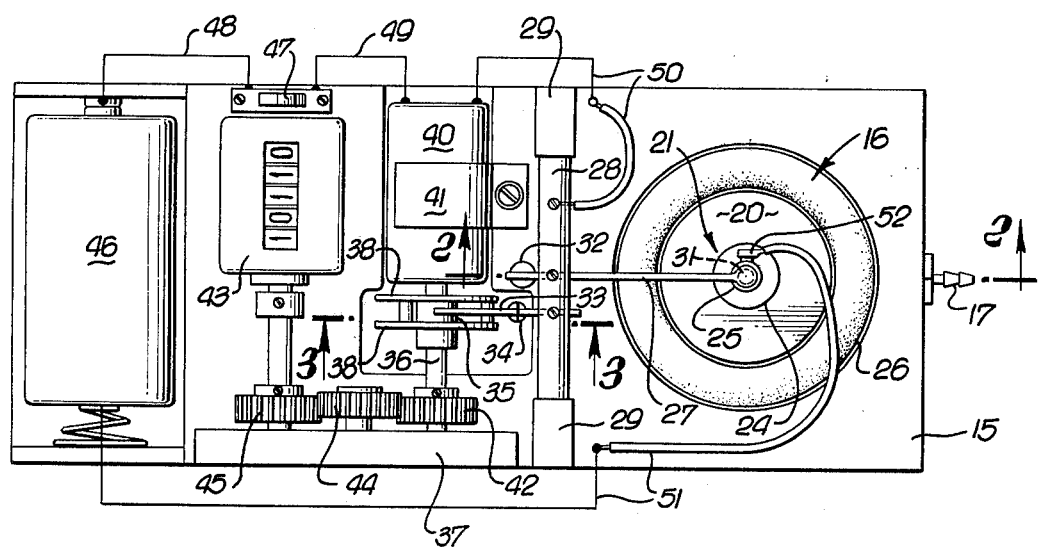
FIG. 1 is a plan of a metering pump according to the first embodiment of the invention.

Referring to FIGS. 1–4, the pump includes a base 15, which may be made of plastic or other electrically insulating material, on which is mounted an expansible chamber 16, such as a bellows, having an inlet 17 screwed into a bore in the base and communicating with the chamber through a port 18. A flexible hose (not shown) can be connected to the inlet 17 which hose may be connected at its remote end to a canister or other suitable filter element (which may be purely physical or include a chemical absorbent or adsorbent) for collecting pollutants carried by the fluid passing therethrough. The canister (not shown) or filter element presents some flow resistance to the free flow of fluid, such as gas. The filter element or canister may, for example, be carried on the clothing of the person whose exposure to pollution is to be determined and who also carries the metering pump, which determines the rate of fluid flow into the expansible chamber 16, this flow rate being dependent upon the suction of this chamber but being principally determined by the flow resistance of the canister or filter and other flow restrictions, if present.

The chamber 16 is urged toward its expanded position by resilient means, such as a coiled spring 19, which, in this embodiment, is an expansion spring and acts through a valve (to be described) to push the movable wall 20 upwards. This wall has a central opening in which is mounted a normally-closed valve 21 which seals the opening by means of an O-ring 22, the valve and O-ring being urged upwards by the spring 19 through an annular flange 23 which also supports the O-ring. The valve includes a central stem and is vertically movable relatively to the top wall 20; it carries a skirted contact assembly 24 having an electrical contact 25, screwed into the valve stem. This contact is electrically insulated from the other parts of the pump, special insulation being unnecessary when, as illustrated, the side wall 26 of the chamber is of rubber or other flexible, electrically insulating material and the base 15 is made of non-conductive material. If the latter is electrically conductive, an optional boot 19a of electrically insulating material may be provided.

The mechanical means for contracting the chamber 16 is a lever arm 27, pivotally mounted on a rotatable, horizontal shaft 28 which is journalled in uprights 29, the arm having a projecting part 30. The arm 27 carries a second electrical contact 31, positioned to engage the contact 25 (FIG. 2) as the shaft 28 is rotated; movement of the arm away from the contact 25 is limited by engagement of the part 30 with an adjusting screw 32 which is secured fast relatively to the base 15. For rotating the shaft 28 there is a second lever arm 33 (FIG. 3) which is urged by a coiled tension spring 34 and is fixed to the shaft 28 to urge the arm 27 away from the wall 20. The spring 34 also urges the arm 33 into engagement with a cylindrical part 35 of circular cross section of a cam which is fast on a rotatable shaft 36, journalled in a block 37 which is fixed to the base 15. The cam carries for rotation with the shaft 36 one or more discs 38 having a plurality, such as three, cam-stubs 39 which sequentially engage the arm 33 to rotate the shaft 28, thereby depressing the electrical contact 31 to perform three functions: First, the contacts 31 and 25 are brought together to close the control circuit (to be described); second, the valve is opened by a downward movement of the flange 23; and third, the bottom of the skirt on the assembly 24 engages the chamber wall 20 to contract the chamber.

The shaft 36 is (or is coupled to) the output shaft of a small electric motor 40 (which may include speed-reducing gears) and is held to the base 15 by a clip 41. The shaft 36 further carries a spur gear 42 which drives the input shaft of a counter 43 through idler gears 44 and 45.

Figure 4:
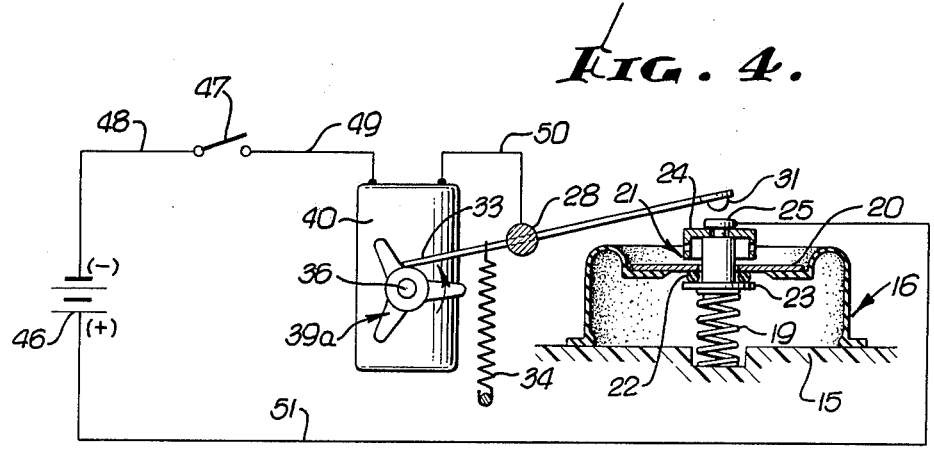
FIG. 4 is a schematic diagram of the control circuit used in the metering pump according to FIGS. 1–3.

The control circuit, shown in FIGS. 1 and 4, includes a source of electrical power 46, such as a 1.5 to 12 volt cell or battery, a main power switch 47, the electric motor 40, the electrical contacts 31 and 25, and suitable connecting conduits. The cam is shown schematically at 39a in FIG. 4. The conduits include circuit elements 48 connecting one terminal of the power source to the switch 47, element 49 connecting this switch to one terminal of the motor, a flexible conduit 50 interconnecting the other motor terminal and the shaft 28, and a flexible conduit 51, which is attached to a tab 52 making electrical contact with the electrical contact 25 and connecting it to the other terminal of the power source 46.

OPERATION OF FIRST EMBODIMENT

Figure 2:
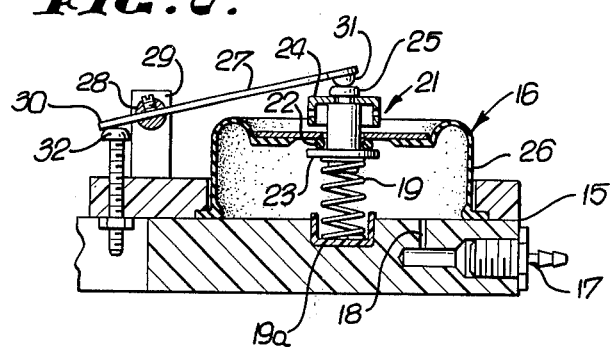
FIG. 2 is a section taken on the line 2—2 of FIG. 1, showing the expansion chamber, the electrical contacts and the valve.
Figure 3:
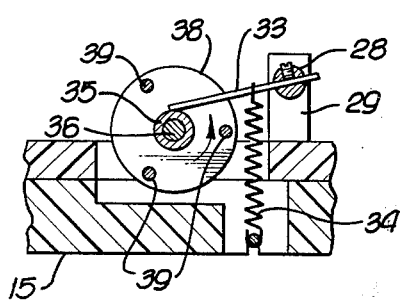
FIG. 3 is a section taken on the line 3—3 of FIG. 1, showing the cam for actuating the pivoted arm.

The reading on the counter 43 is noted and the switch 47 is closed, thereby starting the motor 40 when the parts are as shown in FIGS. 1-3 and causing the disc 38 to turn in the direction of the arrow in FIG. 3. When a cam-stub 39 engages the lever arm 33 the shaft 28 is rotated to depress the contact 31 at the end of the arm 27, thereby first opening the valve by breaking the contact of the O-ring 22 against the wall 20 and, thereafter, by engagement of the shirt assembly 24 with the wall 20, moving the latter downwards against the force of the spring 19 to contract the chamber 16.

When the cam-stub 39 moves beyond and leaves the end of the lever 33, the shaft 28 rotates rapidly to raise the outer end of the arm 27. This action occurs under the influence of the spring 34, permitting the valve to close, the O-ring 22 being forced against the wall 20 by the flange 23 under the influence of the spring 19. The electrical contacts thereupon separate, and their separation interrupts the control circuit, whereby the motor 40 stops and the rotation of the disc 38 and of the cam stubs 39 ceases. The chamber 16 is now able to inspirate fluid through the inlet 17 and port 18 at the rate determined externally, i.e., principally by the flow resistance of the canister or filter, under the influence of the expansion spring 19.

When the wall 20 has moved upwardly the distance necessary for the electrical contacts 25 and 31 to close, the control circuit is again completed, starting the motor 40 and initiating the movement of the lever 33, shaft 28 and lever arm 27. The last may not move at once, depending upon the stopping position of the cam stubs 39 and this arm is, in such case, resilienty raised slightly by the closing of the contacts 25 and 31. After a very short time lapse, such as a small fraction of to one or more seconds, the cam stub 39 engages the arm 33 to repeat the cycle described above.

At the end of the monitoring period — such as one to many hours, such as 24 or more — the switch 47 is opened, the counter 43 is read, and the volume of fluid inspirated is determined and compared with the quantity of pollutants caught in the canister or filter. The volume of fluid inspirated during the monitoring period may be determined in various ways, the simplest being by calibrating the metering pump in terms of unit volume of fluid per count, it being observed that any increase in the changes in volume of the chamber increases the fluid volume flow in terms of the count. Regardless of how the device is calibrated, empirically as suggested above or by calculation, the volume of fluid flowing through the pump is determined independently of the characteristics of the metering pump other than those inherent in the calibration.

It is evident from the foregoing that the electric motor 40 and the cam-actuated lever arm 27 are responsible for about one-half of the cycle of operation of the expansible chamber 16.

SECOND EMBODIMENT

Figure 5:
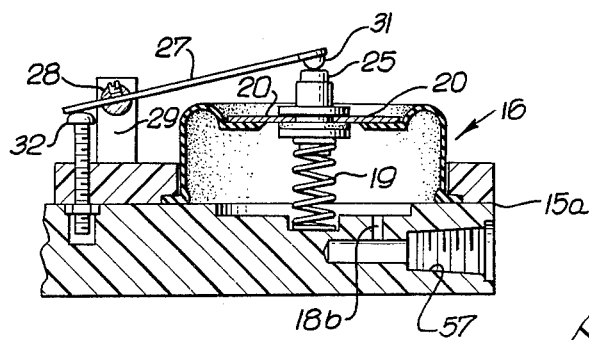
FIG. 5 is a section, similar to FIG. 2, of a second embodiment, showing the expansion chamber, the electrical contacts and the inlet, the flapper valve and orifice being removed.
Figure 6:
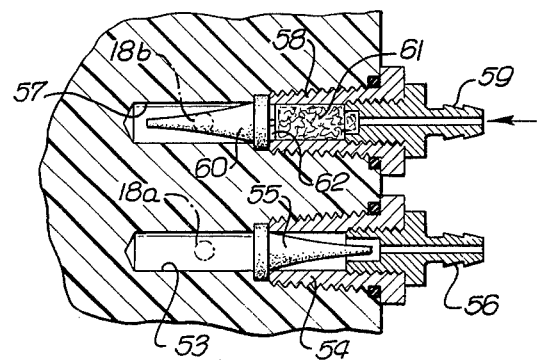
FIG. 6 is a section taken on a horizontal plane and showing the inlet and outlet with the flapper valves of the pump of the second embodiment.

Referring to FIGS. 5 and 6, there is shown a second embodiment wherein the diaphragm valve (including the O-ring bearing on the movable wall) is replaced by a check valve, and the pump is suitable for pressure-output pumping as well as for inspiration. These views should be read together with FIGS. 1 and 3, which are consistent with this embodiment, except as otherwise noted. The parts previously described, save for the elements 15, 17, 18, 22, 23 and 24 are the same.

In the second embodiment, the diaphragm aperture, i.e., the opening in the chamber wall 20, is always closed, as is shown in FIG. 5. Replacing the valve and its O-ring, there is an outlet which includes a bore 53 in the base 15a, communicating with the chamber 16 through a port (not shown) which corresponds to the port 18 and the location of which is shown at 18a in FIG. 6. This is internally threaded and receives an outlet fitting 54 which contains a check valve 55, such as a rubber "duck bill", which is normally closed but opens to let fluid flow out of the chamber when the pressure within the chamber rises. The end of the fitting 54, shown at 56, if formed to receive, externally, a hose for connection to a collecting or filtering device, but it may be vented to the atmosphere.

At about the level of the bore 53 there is provided a second bore 57 which communicates with the chamber 16 through a port 18b and is also internally threaded to receive an inlet fitting 58, having an end 59 about which may be fitted a hose connected to a canister or filter. Under some operating conditions the end 59 may be left open to the atmosphere, or a hose may be applied to connect the inlet to a source of fluid, either gaseous or liquid. The fitting 58 carries a check valve 60, which may also be a rubber "duck bill", as shown, which is normally closed but which opens to admit fluid into the chamber 16 upon a fall of the pressure therein. The fitting 58 optionally, but preferably, contains filter material 61 and an orifice plate 62, the function of the filter being to filter out material that may collect within the expansible chamber if not filtered out. The plate may increase the velocity of the entering fluid. If desired, the material 61 can serve as the filter, absorbent or adsorbent to collect the pollutants, but it is preferred to use it only to insure that only clean fluid enters the expansible chamber.

OPERATION OF SECOND EMBODIMENT

Operation of the control circuit, motor and counter, including movements of the shaft 28 and arm 27, are as was described for the first embodiment. During the motor-driven movement of the lever arm 27, the chamber 16 is contracted, causing fluid to be expelled through the outlet valve 55, which opens in response to a rise in pressure; the inlet check valve 60 then remains closed. The quantity of fluid forced out through the outlet fitting 54 and its end 56 is proportional to the count on the counter 43.

During movement of the end of the arm 27 away from the wall 20, the chamber 16 expands under the influence of the expansion spring 19, drawing in fluid through the fitting 58, its end 59, and the now-open check valve 60. If no resistance is presented to the flow of fluid, the movement of the wall 20 accurately is proportional to the movement of the counter 43. Without any flow resistance, the wall 20 moves rapidly to expand the chamber. If any appreciable flow resistance is present, as may be created by a canister or filter and/or the filter 61 and the plate 62, the wall 20 moves more slowly. In any case, the counter 43 shows a count the increase of which is proportional to the volume of fluid flow through the metering pump.

It may be noted that the resistance to flow created by the filter 61 and/or the plate 62, together with the flow resistance of the canister at the end of the hose attached to the inlet end 59, determine the flow rate, and that all are collectively herein considered as governing, externally, the flow rate. Also, when the outlet end 56 is connected to an element that restricts the flow of fluid, it determines or contributes to the determination of the flow rate.

The proportionality of increases in the counts of the counter 43 to the volume of fluid caused by increased flow resistance of the parts 61 and/or 62 is taken care of by calibrating the metering pump in terms of the counts on the counter 43.

THIRD EMBODIMENT

Figure 7:
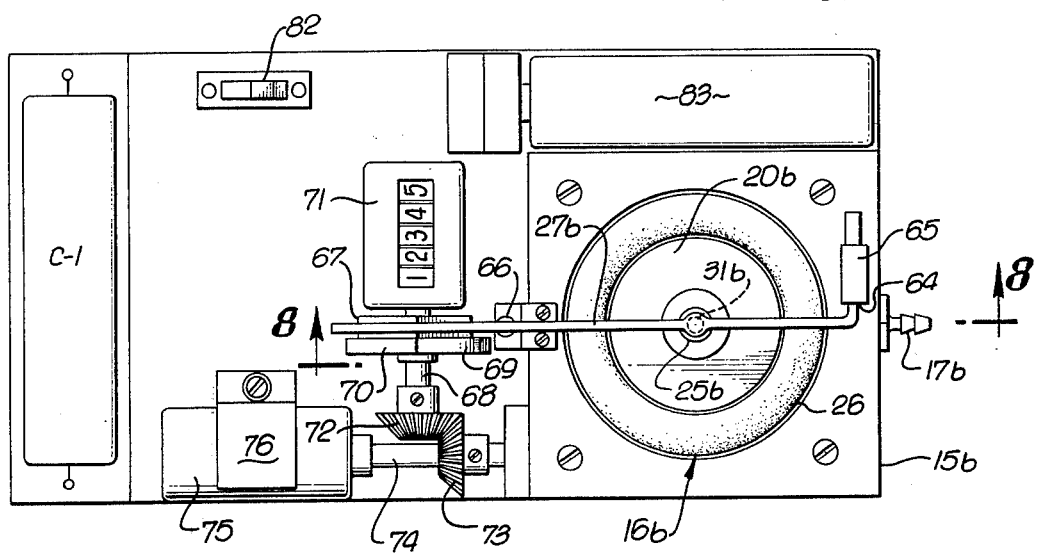
FIG. 7 is a plan of a metering pump according to a third embodiment of the invention, the electronic cover board being removed.
Figure 8:
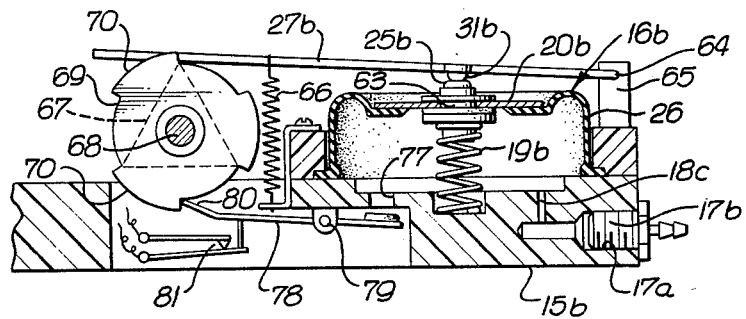
FIG. 8 is a section taken on the line 8—8 of FIG. 7, showing the cam, valve and other parts.
Figure 9:
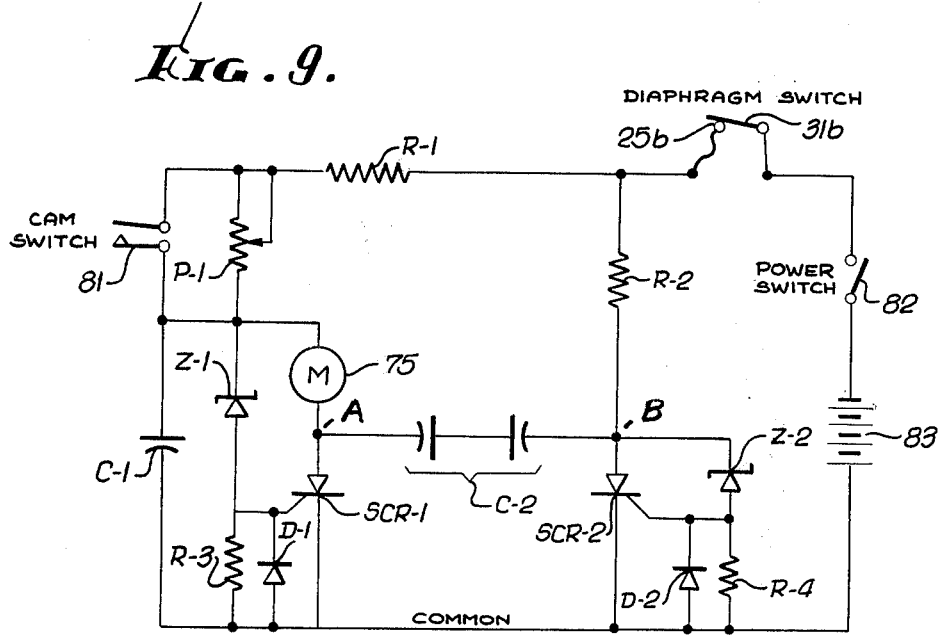
FIG. 9 is a schematic diagram of the control circuit and electronic elements for delivering periodically a pre-determined quantity of energy in the third embodiment.

Referring to FIGS. 7–9, the metering pump includes other features, which may be separately or collectively applied, including a valve actuated by the motor, different gearing, and electronic control components for supplying a predetermined quantity of energy to the motor to permit measurement of very low flow rates.

In the third embodiment, a base 15b, also preferably made of plastic os similar non-conductive material, carries an expansible chamber 16b. The clock has an inlet bore 17a which is internally threaded to receive an inlet fitting 17b and communicates with the chamber through a port 18c. The outer end of the fitting 17b is shaped for connection to an elastic hose the outer end of which may be attached to a canister or filter, as previously described, neither the hose, canister nor filter being shown. The chamber has a movable wall 20b which is resiliently urged upward by a coiled expansion spring 19b, acting against the base block 15b, to expand the chamber. The chamber includes a flexible, annular side wall 26 of rubber or flexible plastic material. The wall 20b has no opening for the flow of fluid but carries a centrally located stem 63 to which is fixed an electrical contact 25b.

The mechanical means is a lever arm 27b which is pivotally mounted at 64 in a block 65, fast to the base 15b, carries at an intermediate part a contact 31b, positioned to make electrical contact with the contact 25b and to depress the wall 20b. The arm is urged to pivot downwards near its end remote from the pivot by a coiled tension spring 66 which is stiff enough to overbalance the force of the spring 19b, and the end of the arm bears on a cam 67 of triangular cross section which cam is fast on a shaft 68. (This triangular cam replaces the stubs 39 of the first embodiment.) The shaft 68 also carries a cam disc 69 having three radially extended cam surfaces 70, the function of which will be described hereinafter. This shaft is suitably journalled relatively to the base 15b and is or is coupled to the input shaft of a counter 71. The shaft 68 is driven by a bevel gear 72 which is affixed to one end and meshes with another bevel gear 73, fast on a drive shaft 74 which is coupled to the output shaft of an electric motor 75, which may include speed-reducing gears to cause the shaft 68 to rotate slowly, e.g., at about 2 – 40 revolutions per minute. The motor 75 is secured to the base 15b by a clip 76.

The expansible chamber has a port 77, formed in the base 15b, which is normally closed by a resilient pad on a valve rocker 78, pivoted to the base at 79 and having its free end 80 in engagement with the cam disc 69. When the end 80 is engaged by the cam portions 70 the port 77 is closed. The rocker 78 further controls an electrical switch 81, which is closed when the port 77 is open, as shown, but which is normally open, when the end 80 is engaged by the cam parts 70.

The circuit for controlling the motor and parts driven thereby, shown in FIG. 9, includes a main power switch 82, a source of electric energy 83, such as a 6 to 15 volt dry cell battery, the above-described switch including the electrical contacts 25b and 31b, the cam-actuated switch 81, and various circuit elements: R-1, R-2, R-3 and R-4 are resistors which may, for example, have 470, 10,000, 10,000 and 10,000 ohms respectively; P-1 is a potentiometer, e.g., of 2,000 ohms resistance; Z-1 and Z-2 are Zener diodes which may be 6.8 and 5.6 volts, respectively; C-1 and C-2 are capacitors, e.g., of 2400 and 23.5 mmf. capacities, respectively, C-2 being nonpolarized, as by mounting two 47 mmf. capacity units back to back; D-1 and D-2 are diodes; and SCR-1 and SCR-2 are silicon controlled rectifiers (often called Thyristors). These elements are interconnected by conductors, as shown, the junctions points A and B being used in the following description.

OPERATION OF THIRD EMBODIMENT

When the main switch 82 and the contacts 25b and 31b are closed, power from the battery 83 is applied to the Zener diode Z-2. This diode reaches its breakdown voltage before the diode Z-1 does, firing the rectifier SCR-2. Junction point B is then nearly at the potential of the circuit common (at the negative or lower terminal of the battery 83). The capacitors C-1 and C-2 are then charged to the voltage across the diode Z-1, which fires the rectifier SCR-1. The capacitor C-1 discharges, to apply electrical energy to and to run the motor 75 momentarily, while the capacitor C-2 produces a reverse voltage which turns off SCR-2. Point A is thereby brought to nearly the potential of the abovementioned circuit common potential; hence C-2 thence charges to the voltage break-down of the Zener Z-2, thereby firing SCR-2 and producing a reverse current that turns off SCR-1. This cycle is repeated indefinitely.

The circuit of FIG. 9, therefore, causes power to be applied to the motor 75 in predetermined increments, and causes the motor to run intermittently.

The operation of the other parts of the third embodiment is similar to that described for the first embodiment, save that:

During the exhaust half of the cycle (wherein the electrical contacts 25b and 31b are closed and the lever arm 27b acts to contract the chamber 16b ) the exhaust port 77 is opened by movement of the valve rocker 78 to permit fluid to escape from the chamber, the disc 69 being oriented to place its raised cam surfaces 70 into proper relation to the cam 67 to cause the valve rocker 78 to open the port 77 only during contraction of the chamber. While the port 77 is uncovered, the switch 81 is closed; this, as is seen in FIG. 9, shorts out the resistor or potentiometer P-1, which speeds up the rate at which the capacitor C-1 is charged. This shortens the time in which the system recovers and returns to its inspiration mode.

During the inspiration half of the cycle the electrical contacts 25b and 31b are separated and the expansion chamber 16b is fully closed. The wall 20b moves upwards at the externally determined rate, and the discussion previously given for the first embodiment is applicable.

FOURTH EMBODIMENT

Figure 10:
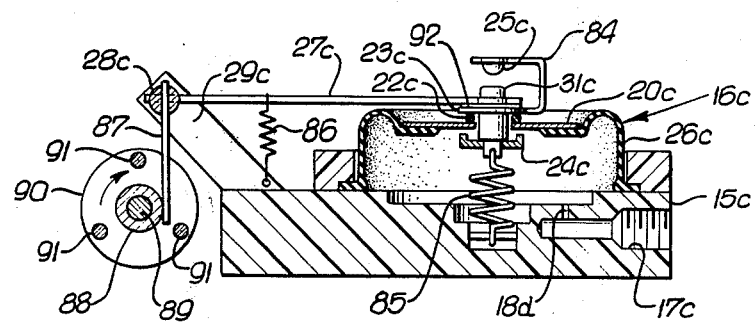
FIG. 10 is a section, similar to FIG. 8, showing a metering pump according to a fourth embodiment of the invention, wherein the diaphragm function is reversed.

FIG. 10 shows a metering pump wherein the function of the diaphragm or top wall and of the lever arm is reversed, so that the movable wall is moved positively to expand the chamber and the chamber is contracted resiliently at an externally determined rate to expel fluid.

In this embodiment, the base 15c has a variable-volume chamber 16c, including a movable top wall 20c and side walls 26c, e.g., made of rubber or other flexible plastic material. The base is formed with an internally threaded outlet bore 17c which communicates with the chamber 16c through a port 18d. A fitting for connection to a hose, as shown at 54 and 56 in FIG. 6, may be screwed into the bore, the hose (not shown) being connected to a device for collecting the fluid and/or the pollutants. The value 55, shown in FIG. 6, may be used but may be omitted. The wall 20c has a central opening fitted with a valve member having an O-ring 22c, pressed downwardly against the wall when the valve is closed by an annular flange 23c on the valve member. The valve member carries a bracket 84 attached for movement therewith, carrying at its top a downwardly directed electrical contact 25c, and an inverted, cup-shaped or skirted member 24c. The member 24c is spaced from the wall 20c when the member is lowered, but is adapted to engage the under side of this wall. A coiled tension spring 85 is attached to the valve member and to the base 15c to close the valve, as shown, as well as to contract the chamber.

A lever arm 27c is pivotally mounted, being fixed to a horizontal shaft 28c which is journalled in arms 29c, fixed to the base, a coiled tension spring 86 being provided to urge the arm against the wall 20c. The spring 86 may be light, and tends to rotate the shaft 28c to the position shown, in which a lever arm 87, which is fixed to the shaft 28c, is pressed against a cylindrical part 88 of circular cross section on a rotatable shaft 89, which is driven by an electric motor (not shown) and is coupled to a counter (also not shown), similar to the motor and counter of the first embodiment or, if desired, of the second or third embodiment. The shaft 89 carries fast for rotation therewith one or more discs 90 carrying a plurality, such as three, cam-stubs 91, which are positioned to engage the arm 87 in sequence to rock the shaft 28c and arm 27c against the contracting force of the spring 86.

The lever arm 27c carries an electric contact 31c, which is upwardly directed and is positioned to engage the contact 25c. To avoid electric contact between the valve member or the bracket 84 and the arm 27c, the latter has a layer 92 of insulating material at its bottom. It will be understood that the block 15c is made of electrically non-conductive material; if not, the spring 85, as well as the spring 86 and other parts, must be suitably insulated.

The control circuit of FIG. 4 or FIG. 9 may be used.

OPERATION OF FOURTH EMBODIMENT

When the pump is in the position shown, the chamber 16c is expanded, the movable wall 20c being up; the central valve is closed by the action of the spring 85 which pulls the valve member down to force the O-ring 22c against the wall; and the electrical contacts 25c and 31c are separated. Hence, power is shut off from the electric motor and the shaft 89 does not turn. Fluid is expelled from the chamber 16c through the outlet bore 17c at an externally-determined rate under the influence of the tension spring 85. During this movement the arm 27c remains stationary.

When the wall 20c has moved downwards a distance sufficient to close the electrical contacts 25c and 31c, power is applied to the motor (e.g., as described above for the first embodiment) and the shaft 89 is rotated, also moving the counter. This causes the arm 87 to be engaged by one of the cam-stubs 91, moving the arm 27c to raise the valve member and permit fluid, such as air, to enter the chamber 16c. This movement also raises the wall by engagement of the contacts and through the bracket 84.

When the cam-stub 91 leaves the arm 87, the spring 86 restores the arm 27c to the position shown, thereby separating the electrical contacts 25c and 31c. This interrupts power to and stops the motor, stopping further rotation of the shaft 89. This also permits the intake valve to be closed under the influence of the spring 85, restoring the pump to the starting condition.

I claim as my invention:

1. In a metering pump for measuring the flow of a fluid, the combination of a variable-volume chamber which expands and contracts as fluid admitted thereto and withdrawn therefrom, respectively, means for reciprocatively altering the volume of the chamber including resilient means urging the chamber toward one direction of volume alteration at a rate determined by the externally-determined rate of the fluid flow and mechanical means for positively altering the chamber volume in the other direction, the mechanical means being ineffective to control the chamber volume during at least a part of the volume alteration in the said one direction, valve means for the chamber arranged to cause fluid flow therethrough upon reciprocative alteration of the chamber volume, and means for counting the alterations of the chamber volume, said counting means being effective only during alteration of the chamber volume in one of said directions.

2. The metering pump according to claim 1 wherein the pump is an inspirator for measuring the volume of fluid flowing into the chamber at an externally-determined rate, the said resilient means urges the chamber in the direction to expand the chamber volume, and the mechanical means contracts the chamber volume.

3. The metering pump according to claim 2 wherein the valve means including a normally-closed valve connected to the chamber and means for opening the valve while the chamber is being contracted.

4. The metering pump according to claim 1 wherein the pump is an inspirator for measuring the volume of a gas flowing into the chamber at an externally-determined rate, the chamber includes a movable wall for altering the chamber volume, the said resilient means urges the wall to expand the chamber volume, the mechanical means is arranged to move the wall to contract the chamber volume, said wall having an opening for the outflow of gas which is normally closed by a valve included in said valve means, said pump having means for opening the said valve when the mechanical means moves the wall to contract the chamber volume, an electrical contact movable with said wall and a second electrical contact movable with the mechanical means, said contacts being arranged to be closed when the mechanical means contracts the chamber volume and open during at least the major part of the movement of the wall to expand the chamber volume, and a control circuit containing, in series, a source of electrical power, said contacts, and an electrical motor, said electric motor being coupled to operate said mechanical means and the counter being coupled to the electric motor.

5. The metering pump according to claim 1 wherein the pump can expel fluid from the chamber at an externally-determined rate, the said resilient means urges the chamber to contract the chamber volume, and the mechanical means expands the chamber volume.

6. The metering pump according to claim 1 wherein the pump can expel a gas from the chamber at an externally-determined rate, the chamber includes a movable wall for altering the chamber volume, the said resilient means urges the wall to contract the chamber volume, the mechanical means is arranged to expand the chamber volume, said chamber having an inlet opening for the inflow of gas which is normally closed by a valve included in said valve means, said pump having means for opening the said valve when the mechanical means moves the wall to expand the chamber volume.

7. The metering pump according to claim 6 which includes an electrical contact movable with said wall, a second electrical contact movable with the mechanical means, said contacts being arranged to be closed when the mechanical means expands the chamber volume and open during at least a major part of the movement of the wall to contract the chamber, and a control circuit containing, in series, a source of electrical power, the said contacts, and an electric motor, said electric motor being coupled to operate said mechanical means and the counter being coupled to the electric motor.

8. The metering pump according to claim 1 wherein said valve means includes a pair of check valves of which one is arranged to admit fluid into the chamber and the other is arranged to exhaust fluid from the chamber, the latter valve being arranged to open only at a pressure within the chamber which is greater than a predetermined pressure within the chamber which is greater than the pressure within the chamber during inflow of fluid thereinto.

9. The metering pump according to claim 1 which includes an electrical control circuit having, in series, electrical contacts which are opened when the mechanical means moves in the said one direction and are closed when the mechanical means moves in the said other direction, said control circuit being arranged and connected to control the operation of an electric motor which is mechanically coupled to said counter and to the said mechanical means.

10. The metering pump according to claim 9 wherein the chamber includes a movable wall for altering the chamber volume, said electrical contacts are mounted one on the movable wall and the other on the said mechanical means, and the mechanical means includes a lever arm pivotally mounted and engagable with a part of the wall to close the contacts and move the wall to alter the chamber volume in the said other direction, said lever arm being actuated by the said electric motor through a cam mechanism.

11. In a metering pump for measuring the flow of a fluid, the combination of a variable-volume chamber having a movable wall which expands and contracts the volume of the chamber as fluid is admitted and withdrawn therefrom, means for reciprocating said wall including resilient means urging the wall in one direction at a speed determined by the flow of fluid in one direction, as determined externally of the pump, and positive mechanical means for moving the wall in the opposite direction, the said mechanical means being ineffective to control the movement of the wall during at least a part of the movement of the wall in said one direction, valve means for said chamber for causing the fluid to flow therethrough upon reciprocation of the movable wall, and means for counting the movements of said wall including a counter and a circuit connected to the counter having electrical contacts movable with said wall and with said mechanical means, respectively, which contacts are opened to disable said counting means when the mechanical means moves in the said one direction and is separated from the movable wall.

12. The metering pump according to claim 11 wherein said mechanical means is a lever arm pivotally mounted for engaging the movable wall and activated by a cam which is driven by an electric motor, said lever arm carrying at a part thereof which is engagable with a part of the wall one of said electrical contacts, the movable wall carrying the other of said contacts, and said counting means in coupled to said electric motor, said circuit including a source of electrical power, said motor and said contacts.

13. The metering pump according to claim 1 wherein said valve means is mechanically actuated in at least one of its closed and opened conditions, said actuation being synchronized with the alterations of the volume of said chamber.

* * * * *